(12) United States Patent
Göttsch et al.

(10) Patent No.: US 8,560,220 B2
(45) Date of Patent: Oct. 15, 2013

(54) METHOD AND APPARATUS FOR DETERMINING A PLAUSIBLE LANE FOR GUIDING A VEHICLE AND AN AUTOMOBILE

(75) Inventors: Jan Göttsch, Lenting (DE); Stefan Schön, Ingolstadt (DE); Wolfgang Mielich, Ingolstadt (DE)

(73) Assignee: Audi AG, Ingolstadt (DE)

( * ) Notice: Subject to any disclaimer, the term of this patent is extended or adjusted under 35 U.S.C. 154(b) by 2 days.

(21) Appl. No.: 13/284,205

(22) Filed: Oct. 28, 2011

(65) Prior Publication Data

US 2012/0277990 A1 Nov. 1, 2012

(30) Foreign Application Priority Data

Oct. 30, 2010 (DE) .......................... 10 2010 050 167

(51) Int. Cl.
*G06F 17/10* (2006.01)
(52) U.S. Cl.
USPC ........... 701/301; 701/408; 701/414; 701/422; 701/439
(58) Field of Classification Search
USPC .......................... 701/408, 414, 422, 439, 301
See application file for complete search history.

(56) References Cited

U.S. PATENT DOCUMENTS

| | | | | |
|---|---|---|---|---|
| 5,555,312 A * | 9/1996 | Shima et al. | .................. | 382/104 |
| 6,085,151 A * | 7/2000 | Farmer et al. | .................. | 701/301 |
| 6,195,020 B1 * | 2/2001 | Brodeur et al. | ............... | 340/933 |
| 6,420,997 B1 * | 7/2002 | Cong | ............................... | 342/70 |
| 6,470,272 B2 * | 10/2002 | Cong et al. | ..................... | 701/301 |
| 6,556,916 B2 * | 4/2003 | Waite et al. | ................. | 701/117 |
| 6,653,935 B1 * | 11/2003 | Winner et al. | ................ | 340/435 |
| 6,675,094 B2 * | 1/2004 | Russell et al. | ................ | 701/301 |
| 6,819,779 B1 * | 11/2004 | Nichani | ........................ | 382/104 |
| 6,842,531 B2 * | 1/2005 | Ohtsuka et al. | ............... | 382/104 |
| 7,206,697 B2 * | 4/2007 | Olney et al. | ..................... | 701/301 |
| 7,379,815 B2 * | 5/2008 | Kobayashi et al. | ........... | 701/300 |
| 7,386,385 B2 * | 6/2008 | Heinrichs-Bartscher | ....... | 701/93 |
| 7,460,951 B2 * | 12/2008 | Altan et al. | .................. | 701/536 |

(Continued)

FOREIGN PATENT DOCUMENTS

DE 10 2006 004 764 3/2007
DE 10 2006 040 334 3/2008

OTHER PUBLICATIONS

English Translation of DE 10 2006 040 334 A1, published Mar. 6, 2008, all pages.*

(Continued)

*Primary Examiner* — Calvin Cheung
(74) *Attorney, Agent, or Firm* — Henry M. Feiereisen LLC

(57) ABSTRACT

A method for determining a lane on a roadway for a vehicle having at least two independent sensors includes the steps of obtaining with a first sensor data for a first area surrounding the vehicle, obtaining with at least two additional sensors data for at least two additional areas surrounding the vehicle, determining a first lane based on the data for the first area, determining at least two additional lanes based on the data for the at least two additional areas, and determining a resulting lane from the first and the at least two additional lanes, wherein when two of the least three lanes are identical and a third of the at least three lanes is not identical with the two identical lanes, the third lane is not taken into account when determining the resulting lane.

12 Claims, 1 Drawing Sheet

(56) References Cited

U.S. PATENT DOCUMENTS

| | | | |
|---|---|---|---|
| 7,742,864 B2* | 6/2010 | Sekiguchi | 701/96 |
| 2004/0102886 A1* | 5/2004 | Lin et al. | 701/70 |
| 2004/0167717 A1* | 8/2004 | Buchanan et al. | 701/301 |
| 2004/0176936 A1* | 9/2004 | Ohtsu et al. | 703/8 |
| 2006/0015252 A1* | 1/2006 | Yamamoto et al. | 701/301 |
| 2007/0027597 A1* | 2/2007 | Breuel et al. | 701/41 |
| 2007/0080825 A1* | 4/2007 | Shiller | 340/903 |
| 2010/0076684 A1* | 3/2010 | Schiffmann et al. | 701/301 |
| 2010/0253598 A1* | 10/2010 | Szczerba et al. | 345/7 |
| 2010/0295707 A1* | 11/2010 | Bennie et al. | 340/988 |

OTHER PUBLICATIONS

English Translation of DE 10 2006 004 764 A1, published Mar. 29, 2007, all pages.*

William Strunk Jr. and E.B. White, The Elements of Style, 3rd Edition, MacMillan Publishing Co., Inc., 1979, all pages.*

Ogawa et al., Lane Recognition Using On-Vehicle LIDAR, Jun. 2006, IEEE Intelligent Vehicles Symposium 2006, pp. 540-545.*

Hywel, Variable Time-Constant Low-Pass Filters Using Kalman Filter Algorithms, 1999, all pages. http://www.cisp.jhu.edu/ws98/projects/dynamic/presentations/finalhtml/node43.html.*

Kirchner et al., Integrated Obstacle and Road Tracking Using a Laser Scanner, 2000, Proceedings of the IEEE Intelligent Vehicles Symposium 2000, pp. 675-681.*

Gem et al., Robust Vehicle Tracking Fusing Radar and Vision, 2001, International Conference on Multisensor Fusion and Integration for Intelligent Systems 2001 (MFI '01), pp. 323-328.*

Weiss et al., Environmental Perception and Situation Assessment for an Advanced Highway Assistant, Jun. 2005, Proceedings of the IEEE Intelligent Vehicles Symposium 2005, pp. 472-477.*

* cited by examiner

METHOD AND APPARATUS FOR DETERMINING A PLAUSIBLE LANE FOR GUIDING A VEHICLE AND AN AUTOMOBILE

CROSS-REFERENCES TO RELATED APPLICATIONS

This application claims the priority of German Patent Application, Serial No. 10 2010 050 167.0, filed Oct. 30, 2010, pursuant to 35 U.S.C. 119(a)-(d), the content of which is incorporated herein by reference in its entirety as if fully set forth herein.

BACKGROUND OF THE INVENTION

The present invention relates to a method for determining a lane for a vehicle having at least two independent sensors. The invention also relates to an apparatus for determining a lane for a vehicle having at least two independent sensors and a computing device. Lastly, the invention relates to an automobile or a driver assist system with such an apparatus.

The following discussion of related art is provided to assist the reader in understanding the advantages of the invention, and is not to be construed as an admission that this related art is prior art to this invention.

Various driver assist systems for assisting a driver of a vehicle with driving an automobile are known. For example, an adaptive speed control system (adaptive cruise control, ACC) is used which includes sensors capable of detecting objects within the surroundings of the vehicle. The adaptive speed control then operates on the data relating to the detected objects. A lane change assistant is also known which informs the driver of possible dangers when changing a lane. Other modern vehicle systems use a camera installed behind the windshield for detecting lane markers (lines, curbs, etc.), traffic information (e.g., traffic signs) and objects (vehicles, pedestrians, etc.). A lane assistant uses, for example, the detected lane markers to assist the driver in maintaining the lane by way of a steering assist. Lastly, headlight systems with adjustable illumination widths are known which use object data from vehicles in front or from oncoming vehicles to achieve optimal illumination of the area ahead of the vehicle for the driver without blinding the other drivers. The sensors used in these systems may be based on different technologies. For example, it is known to employ ultrasound sensors, video systems, laser scanners and radar sensors.

It would therefore be desirable and advantageous to obviate prior art shortcomings and to provide an improved method and an apparatus for determining a lane for a vehicle that can be safely negotiated by the vehicle.

SUMMARY OF THE INVENTION

The present invention resolves prior art problems with a method for determining a lane on a roadway for a vehicle having at least two independent sensors. In particular, the sensors may be part of the vehicle itself. In particular, lane refers to an area which is available for the vehicle for traveling in one direction. In particular, the width of the lane is then determined from a basic lane width and optionally an additional allowance for traffic in the opposite direction. In particular, the lane provides the area required by the vehicle for unobstructed travel.

According to one aspect of the invention, a method for determining a lane on a roadway for a vehicle having at least two independent sensors includes the steps of: a) obtaining data for a first area surrounding the vehicle with at least one first sensor, b) determining a first lane based on the data for the first area surrounding the vehicle, c) obtaining data for at least two additional areas surrounding the vehicle with at least two additional sensors, d) determining at least two additional lanes based on the data for the at least two additional areas surrounding the vehicle, and e) determining a resulting lane from the first and the at least two additional lanes, wherein when two of the first and the at least two additional lanes are identical and a third of the first and the at least two additional lanes is not identical with the two identical lanes, the third lane is not taken into account when determining the resulting lane.

The term area surrounding the vehicle refers particularly to a surrounding area of the vehicle within which objects can be detected by the sensor. In particular, the area surrounding the vehicle can therefore be a detection region of the sensor. However, data relating to the first area surrounding the vehicle can also be obtained by obtaining with the first sensor position data of the vehicle, and associating with the position data, for example from a database, an area surrounding the vehicle having certain features of elements included in the surrounding area.

The additional areas surrounding the vehicle can, in particular, be defined analogous to the first area surrounding the vehicle. Individual or all of the additional areas surrounding the vehicle may be identical to the first area surrounding the vehicle. However, they may also be different from the first area surrounding the vehicle or different from each other. Even if the individual areas surrounding the vehicle are identical, the data obtained with the respective sensors for the individual areas surrounding the vehicle may be different from each other and may have different information. The first area surrounding the vehicle and the at least one additional area surrounding the vehicle refer particularly to surrounding areas of the vehicles which are determined at the same time.

In particular, all lanes determined at steps a) to d) are included or at least taken into consideration when determining the resulting lane. In particular, the resulting lane may be identical to the determined lane. However, the resulting lane may also be formed by a synthesis from several individual lanes. Only selected individual or all elements of the previously determined lanes may be taken into consideration when determining the resulting lane. If two of the at least three lanes are identical and a third of the at least three lanes is not identical with the two lanes, then the third lane is not taken into consideration when determining the resulting lane.

With the method of the invention, a lane can be reliably determined where the vehicle can follow the traffic flow unobstructed. Initially, individual independent lanes are determined by one or several sensors. A resulting lane is then determined from the results by a cascaded method. This redundant method allows a reliable determination of the lane and therefore increases the precision and correctness of the lane determination. More exact and better information can thus be provided to the driver and/or to one or more systems of the vehicle (driver assist system, pre-crash system, etc.). The overall driving safety is also improved. Preferably, at least three independent lanes are used for determining the resulting lane.

According to an advantageous feature of the present invention, a weighting value may be associated with each of the first and the at least two additional lanes, wherein the first and the at least two additional lanes are taken into account at step e) when determining the resulting lane according to their weights. The individual weighting values may hereby define particularly a priority with which the individually determined lanes should be considered in the cascaded process. In particular, the weighting value may depend on the respective traffic situation or factors determined by the surroundings. The lanes determined in the steps b) and d) are rated according to their relevance through combination with the respective weighting value and are therefore taken into consideration with different importance in the determination of the resulting lane. However, weighting values may also be associated with the lanes which prevent individual or all features of the respective lane to influence the resulting lane. Although such lanes may be considered when determining the resulting lane in a kind of pre-selection, their characteristics are not considered in the resulting lane. For example, the elements from all lanes may be included in the resulting lane. The respective lanes can be taken into consideration depending on the traffic situation when determining the resulting lane with the weighting value. A realistic resulting lane can thus be very precisely determined.

According to an advantageous feature of the present invention, the resulting lane at step e) may be obtained from a combination of at least two lanes. The at least two lanes are taken into consideration when determining the resulting lane not only according to a pre-selection, but elements from the at least two lanes also entering the resulting lane. The resulting lane is then obtained from a synthesis of the at least two lanes.

According to another advantageous feature of the present invention, data for a position and/or a motion state of an object may be obtained at step a) and/or at step c). In particular, the object may be another vehicle. The object may be located within the surrounding area of the vehicle for which data are obtained. In particular, when position and/or motion state data of other vehicles located in the surrounding area of the vehicle for which the lane is to be determined are determined, this lane can be very accurately adapted to the actual traffic situation which is otherwise difficult to predict. Accidents are thereby safely prevented.

Moreover, data relating to lane markers may be obtained at step a) and/or at step c). The lane markers define important boundary regions in which a lane to be determined should typically be located. Lane markers are, on one hand, relatively simple and easy to detect and, on the other hand, make it possible to obtain important data relating to a possible lane.

According to another advantageous feature of the present invention, at step a) and/or at step c), data may be obtained from a digital map by taking into consideration outputs from a sensor determining the actual position of the vehicle. In particular, the sensor employed at steps a) and/or c) may not be a sensor which directly captures the corresponding area surrounding the vehicle, which may instead be extracted from the digital map by taking into consideration the inputs of the sensor measuring the own position. In particular, the sensor determining the own position may determine the instantaneous local position of the vehicle and match this position to the digital map. In particular, map data or map data attributes may then be available in a surrounding area of the respective map position which can be used for determining the respective lane. In this way, significant data relating to an area surrounding the vehicle can be obtained using relatively simple means. Only the own position of the vehicle must be determined, without requiring the sensor to capture the respective area surrounding the vehicle.

According to another advantageous feature of the present invention, at step a) and/or at step c), data may be obtained with a sensor for the surroundings and/or a sensor for the drive state. The sensor for the surroundings may be particularly configured to receive signals from the area surrounding the vehicle. In particular, the area surrounding the vehicle may then be a capture region of the sensor for the surroundings. The sensor for the surroundings may also be configured to transmit its own signals to the surroundings of the vehicle and wait for a corresponding signal response. In particularly, the drive state sensor may be configured to independently determine the drive state of the vehicle. To this end, the drive state sensor may particularly measure data relating to the speed and/or the acceleration of the vehicle. By using sensors for the surroundings and/or drive state sensors, instantaneous and perhaps unanticipated drive situations can be immediately taken into consideration when determining the lane, resulting in a lane which is exactly matched to the respective drive situation.

According to an advantageous feature of the present invention, the method may include the additional step f) of outputting control and/or regulating signals depending on the resulting lane to at least semiautomatically steer the vehicle on the road surface. Reliable determination of the lane with the method of the cascaded lane computation allows the vehicle to be driven autonomously and automatically, without for example requiring intervention from the driver. In particular, integrated transverse and/or longitudinal guiding may be provided. The resulting lane determined within the context of the method is so precise that the vehicle can automatically follow the traffic flow and the driver needs to intervene only to make corrections.

According to another aspect of the invention, an apparatus according to the invention is used for determining a lane for a vehicle and includes at least three independent sensors and a computing device. A first sensor is configured to obtain data for the first area surrounding the vehicle. The at least two additional sensors are configured to obtain data for at least two additional areas surrounding the vehicle. The computing device is constructed to determine a first lane based on data for the first area surrounding the vehicle and at least two additional lanes based on the data for the at least two additional areas surrounding the vehicle. The computing device is also configured to determine a resulting lane from the first and the at least two additional lanes, wherein when two of the at least three lanes are identical and a third of the at least three lanes is not identical with the two lanes, the third lane is not taken into consideration when determining the resulting lane.

According to another aspect of the invention, an automobile and/or a driver assist system include the apparatus according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
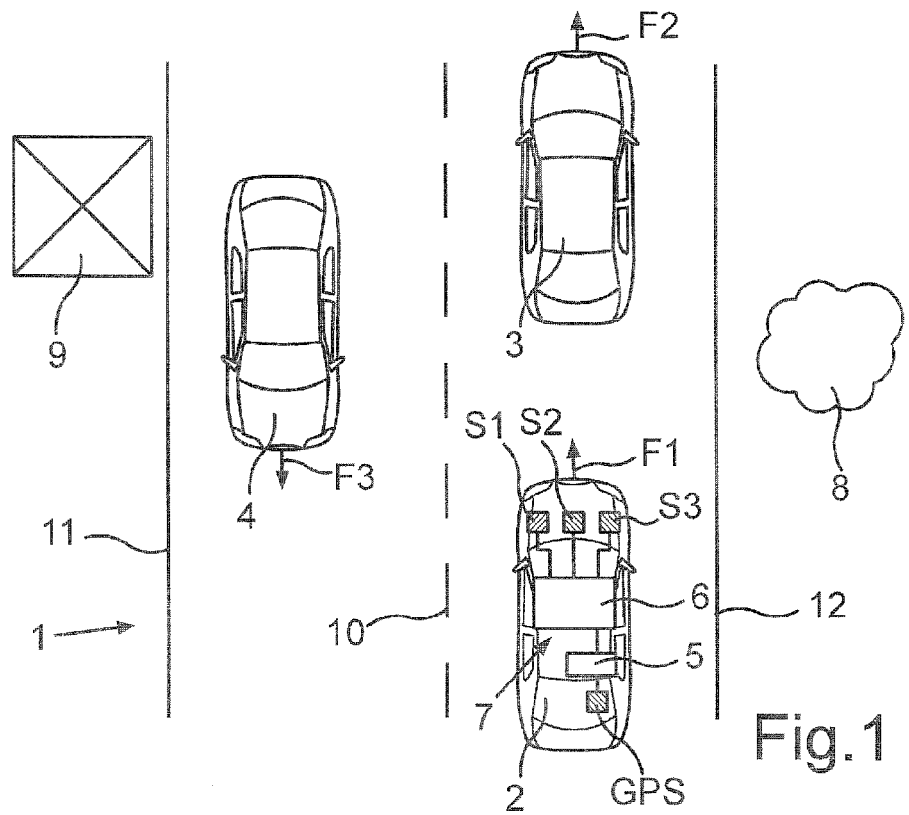
FIG. 1 shows a top view onto a lane with several automobiles.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an automobile 2 moving on a roadway 1 in the travel direction F1. An additional automobile 3 travels in front of the automobile 2 in the same travel direction F2. In addition, an automobile 4 is shown which travels in the opposite lane in the travel direction F3 opposite to the automobile 2. The two lanes are separated from each other by the lane markers of a median strip 10. The lane 1 is delimited by a left curb 11 and a right curb 12, which also represent lane markers. A house 9 is located outside the lane 1 and to the left of the left curb 11, whereas a tree 8 is located to the right of the right curb 12.

The automobile 2 includes a driver assist system 7 which includes three sensors S1, S2 and S3, a GPS (Global Positioning System) sensor GPS, a digital map 5 and a computing device 6.

Figure 2:
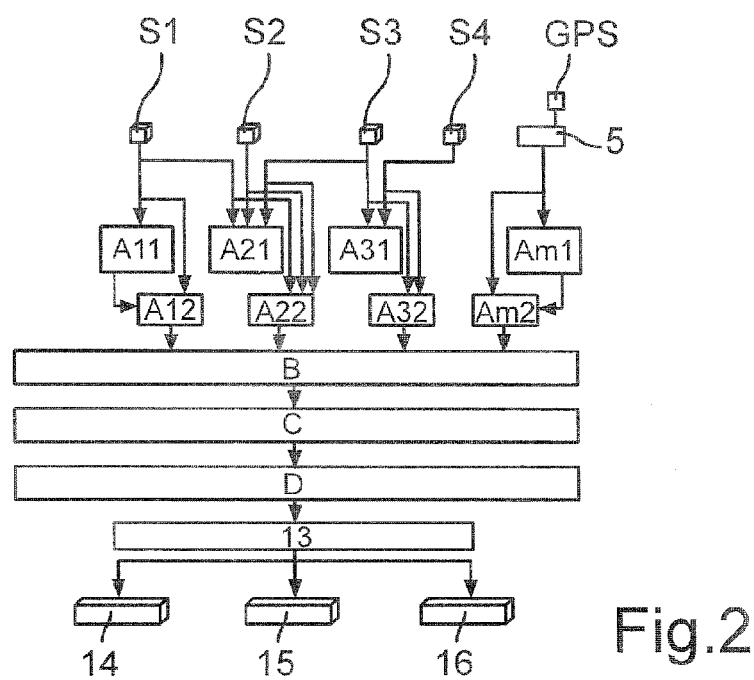
FIG. 2 shows an exemplary embodiment of a flow chart of the method according to the present invention; and Table 1 is an exemplary table for determining the independent lanes for computing the lane for the lane guidance.

FIG. 2 illustrates schematically a method suitable to determine a resulting lane and useful for the autonomous guidance of a vehicle. In the exemplary embodiment, the sensor S1 is a camera which includes an image processing control device. The lane markers (median strip 10 and curbs 11 and 12) in front of the automobile 2 are captured with the camera S1 and evaluated. The camera S1 has a capture range covering a first area surrounding the vehicle. Only lane markers located inside the capture region of the camera S1 are detected. The camera S1 represents a surroundings sensor of the automobile 2. At step A11, a first independent lane uFS1 is determined from the data of the lane markers. This lane uFS1 is rated at step A12 with an associated quality measure.

The sensor S2 is also a surroundings sensor. It may be a radar sensor, a laser scanner, an ultrasound sensor or, for example, a photo mixer device (PMD). The sensor S3 is also a surroundings sensor and may be one of the sensors of the aforementioned group. Objects located in the associated surrounding area of the vehicle are recognized by the surroundings sensors S1, S2 and S3, for example the tree 8 and the house 9. The objects may include, for example, roadside structures, barricades, road embankments, etc. The sensors S1, S2 and S3 may also recognize moving objects, for example other road users (automobiles, pedestrians, etc.). In the exemplary embodiments, these are the automobiles 3 and 4. Based on the data for the objects, a lane, in which the automobile 2 can move unconstrained, is determined at step A21. The speeds of the other automobiles 3 and 4 as well as the own speed of the automobile 2 are included when forming the lane. In this way, an additional independent lane uFS2 can be determined at step A21, which is then rated with a quality measure at step A22.

The sensors S3 and S4 are surroundings sensors. Based on the information provided by these sensors, a lane change of the automobile 3 in front (target object) can be detected within the framework of the cascaded method. If an additional vehicle is inside the lane, then this vehicle is used as a new target object after the lane change. At step A31, an additional independent lane uFS3 is determined based on the obtained data for the target object. For this purpose, data from an additional sensor Sn may also be used. The independent lane uFS3 is also assigned a quality measure at step A32.

The driver assist system 7 also includes a navigation system having as essential elements the digital map 5 and the GPS sensor GPS. The GPS sensor GPS is able to determine the own position of the automobile 2 and thus determine the spatial position of the automobile 2 on the digital map 5. Certain map data attributes, such as road curvature, the number of lanes, the type of the road, possible intersections, etc., can be determined on the digital map 5 within a predetermined area surrounding the automobile 2. The further course can be computed based on these predictive road data provided by the navigation system. This allows the determination of an additional independent lane uFSm at step Am1. Weighting with a quality measure is hereby also performed at step Am2.

The individual quality measures determine the priority with which the individually determined lanes uFS1 to uFSm enter the cascaded method. This priority depends on the traffic situation, lane criteria (lane width, lane curvature, existence measure, etc.) and additional environmental factors (e.g., weather).

The lanes uFS1, uFS2, uFS3 and uFSm provided with the respective quality measure at steps A12, A22, A32 and Am2 are compared with each other at step B. At step C, the independent lanes for computing the lane for lane guidance (resulting lane) are determined from Table 1. At a final step D of the method, the lane for lane guidance is computed.

Table 1 takes into consideration in a simplified from only the independent lanes uFS1, uFS2 and uFS3 when determining the resulting lane. Two examples from Table 1 will now be discussed:

According to lane guidance 1b, all independent lanes uFS1, uFS2 and uFS3 are rated with the quality measure OK. All three lanes are taken into account when determining the resulting lane. A comparison of the individual lanes shows that the lanes uFS1 and uFS2 are not identical, whereas the lanes uFS2 and uFS3 are identical. The resulting lane for lane guidance is then calculated from the independent lanes uFS2 and uFS3. The lane uFS1 does not enter the calculation.

In the lane guidance 2b, essentially the lanes uFS1, uFS2 and uFS3 are also considered. However, a pre-selection is performed based on the quality measure. While the lanes uFS2 and uFS3 are rated with the quality measure OK, the lane uFS1 is rated with the quality measure NOK. The lane uFS1 is therefore no longer taken into consideration. Only the lanes uFS2 and uFS3 are compared, showing that uFS2 is not identical with uFS3. Therefore, only the lane uFS3 is considered as resulting lane for lane guidance.

In particular, the quality measures OK and NOK are derived quality measures which can be derived from a basic quality measure or a weighting value. For example, the basic quality measure may assume a value between 0% and 100%. A threshold value, for example the value 60%, may be defined. The three lanes uFS1, uFS2 and uFS3 can then be weighted in the following way: the basic quality measures of the lanes uFS1, uFS2 and uFS3 are, for example, g1=50%, g2=70% and g3=90%. The resulting quality measures are then NOK (because 50%<60%), OK (because 70%>60%) and OK (because 90%>60%). In other words, the lane uFS1 is not considered when determining the resulting lane. Only the lanes uFS2 and uFS3 are taken into consideration for the resulting lane, for example according to their respective quality measures; i.e., the lane uFS2 enters the resulting lane with a fraction of g2/(g2+g3)=7/16, whereas the lane uFS3 enters the resulting lane with a fraction of g3/(g2+g3)=9/16.

Only the determination of a single independent lane is known in the art. These independent lanes determined in this way could be used as one of the at least two independent lanes within the proposed methods the cascaded determination method for the resulting lane. The individual independent lanes are then rated according to their quality, compared with each other, and depending on the result, a single resulting lane is computed from one, several or all independent lanes.

Lastly, a regulation/control can be performed based on the resulting lane. This regulation/control is in the exemplary embodiment a transverse and longitudinal regulation/control of the automobile 2. The information about the resulting lane supplied at step D is transmitted to a transverse and longitudinal controller 13 of the automobile 2. The transverse and longitudinal controller 13 then controls a drive 14, a brake 15 and/or a steering system 16 of the automobile 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

TABLE 1

| | | Lane Quality measure | uFS1 OK | uFS2 OK | uFS3 OK |
|---|---|---|---|---|---|
| Lane guidance 1 | a | Comparison of the lanes uFS1 = uFS2 = uFS3 | | Lane for lane guidance uFS1, uFS2, uFS3 | |
| | b | uFS1 ≠ uFS2 = uFS3 | | uFS2, uFS3 | |
| | c | uFS1 = uFS3 ≠ uFS2 | | uFS1, uFS3 | |
| | d | uFS1 = uFS2 ≠ uFS3 | | uFS1, uFS2 | |
| | e | uFS1 ≠ uFS2 ≠ uFS3 | | uFS3 | |

| | | Lane Quality measure | uFS1 NOK | uFS2 OK | uFS3 OK |
|---|---|---|---|---|---|
| Lane guidance 2 | a | Comparison of the lanes uFS2 = uFS3 | | Lane for lane guidance uFS2, uFS3 | |
| | b | uFS2 ≠ uFS3 | | uFS3 | |

| | | Lane Quality measure | uFS1 OK | uFS2 NOK | uFS3 OK |
|---|---|---|---|---|---|
| Lane guidance 3 | a | Comparison of the lanes uFS1 = uFS3 | | Lane for lane guidance uFS1, uFS3 | |
| | b | uFS1 ≠ uFS3 | | uFS3 | |

| | | Lane Quality measure | uFS1 OK | uFS2 OK | uFS3 NOK |
|---|---|---|---|---|---|
| Lane guidance 4 | a | Comparison of the lanes uFS1 = uFS2 | | Lane for lane guidance uFS1, uFS2 | |
| | b | uFS1 ≠ uFS2 | | uFS2 | |

| | | Lane Quality measure | uFS1 NOK | uFS2 NOK | uFS3 OK |
|---|---|---|---|---|---|
| Lane guidance 5 | a | Comparison of the lanes uFS3 | | Lane for lane guidance uFS3 | |

| | | Lane Quality measure | uFS1 OK | uFS2 NOK | uFS3 NOK |
|---|---|---|---|---|---|
| Lane guidance 6 | a | Comparison of the lanes uFS1 | | Lane for lane guidance uFS1 | |

| | | Lane Quality measure | uFS1 NOK | uFS2 OK | uFS3 NOK |
|---|---|---|---|---|---|
| Lane guidance 7 | a | Comparison of the lanes uFS2 | | Lane for lane guidance uFS2 | |

What is claimed is:

1. A method for determining a physical lane on a roadway for a vehicle having at least three independent sensors, comprising the steps of:
   a) obtaining data for a first area surrounding the vehicle with at least one first sensor;
   b) determining a first representation of the lane based on the data for the first area surrounding the vehicle;
   c) obtaining data for at least two additional areas surrounding the vehicle with at least two additional sensors;
   d) determining at least two additional representations of the lane based on the data for the at least two additional areas surrounding the vehicle;
   e) comparing the first representation of the lane with the at least two additional representations of the lane to determine whether at least two representations of the first representation of the lane and the at least two additional representations of the lane are identical, and
   f) determining the physical lane from the at least two representations of the lane that are identical and omitting from consideration a representation of a lane that is not identical with the at least two identical representations of the lane.

2. The method of claim 1, further comprising the steps of:
   associating a weighting value with the first representation of the lane and the at least two additional representations of the lane, and
   taking into account the first representation of the lane and the at least two additional representations of the lane in accordance with their respective weighting values, when comparing the first representation of the lane with the at least two additional representations of the lane for determining the resulting physical lane at steps e) and f).

3. The method of claim 1, wherein the physical lane is determined at step f) by combining the at least two identical representations of the lanes.

4. The method of claim 1, wherein the data obtained at step a) or at step c), or both, relate to at least one of a position and a motion state of an object.

5. The method of claim 1, wherein the data obtained at step a) or at step c), or both, relate to at least one of a position and a motion state of another vehicle.

6. The method of claim 1, wherein the data obtained at step a) or at step c), or both, relate to lane markers.

7. The method of claim 1, wherein the data obtained at step a) or at step c), or both, comprise data from a digital map by taking into account outputs from an own position determination sensor of the vehicle.

8. The method of claim 1, wherein the data obtained at step a) or at step c), or both, are obtained with at least one of a surroundings sensor and a driving status sensor.

9. The method of claim 1, further comprising the additional step of:
   g) outputting control signals depending on the determined physical lane for at least semi-automatic guidance of the vehicle on the roadway.

10. An apparatus for determining a lane for a vehicle, comprising:
   at least three independent sensors, wherein a first sensor is configured to obtain data relating to a first area surrounding the vehicle and at least two additional sensors are configured to obtain data relating to at least two additional areas surrounding the vehicle, and
   a computing device configured to determine a first representation of the lane based on the data relating to the first area surrounding the vehicle and to determine at least two additional representations of the lane based on the data relating to the at least two additional areas surrounding the vehicle, the computing device further configured to compare the first representation of the lane with the at least two additional representations of the lane to determine whether at least two representations are identical, and to determine the physical lane from the at least two representations of the lane that are identical and omitting from consideration a representation of a lane that is not identical with the at least two identical representations of the lane.

11. An automobile having an apparatus for determining a physical lane for a vehicle, the apparatus comprising:

at least three independent sensors, wherein a first sensor is configured to obtain data relating to a first area surrounding the vehicle and at least two additional sensors are configured to obtain data relating to at least two additional areas surrounding the vehicle, and a computing device configured to determine a first representation of the lane based on the data relating to the first area surrounding the vehicle and to determine at least two additional representation of the lane based on the data relating to the at least two additional areas surrounding the vehicle, the computing device further configured to compare the first representation of the lane with the at least two additional representations of the lane to determine whether at least two representations are identical, and to determine the physical lane from the at least two representations of the lane that are identical and omitting from consideration a representation of a lane that is not identical with the at least two identical representations of the lane.

12. A driver assist system having an apparatus for determining a lane for a vehicle, the apparatus comprising:

at least three independent sensors, wherein a first sensor is configured to obtain data relating to a first area surrounding the vehicle and at least two additional sensors are configured to obtain data relating to at least two additional areas surrounding the vehicle, and a computing device configured to determine a first representation of the lane based on the data relating to the first area surrounding the vehicle and to determine at least two additional representation of the lane based on the data relating to the at least two additional areas surrounding the vehicle, the computing device further configured to compare the first representation of the lane with the at least two additional representations of the lane to determine whether at least two representations are identical, and to determine the physical lane from the at least two representations of the lane that are identical and omitting from consideration a representation of a lane that is not identical with the at least two identical representations of the lane.

* * * * *